Sept. 1, 1942.   W. H. PRATT   2,294,692
MEASUREMENT OF VOLT AMPERE DEMAND
Filed Feb. 24, 1940
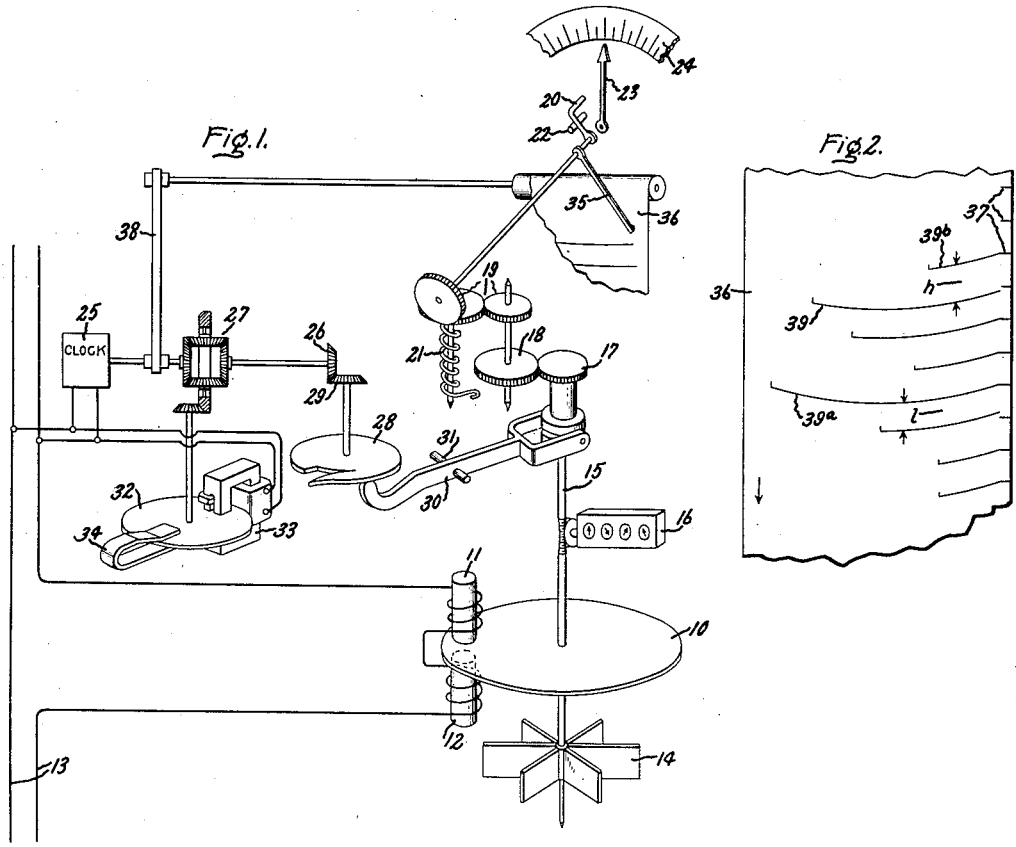
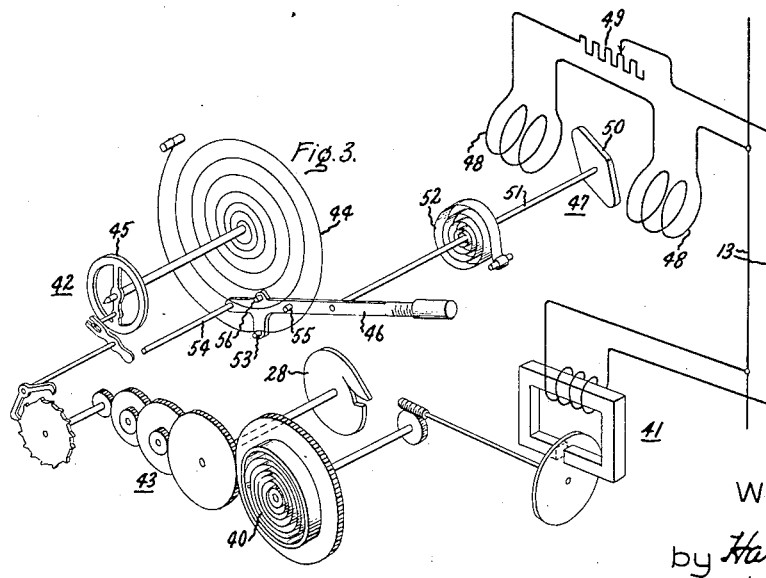
Inventor:
William H. Pratt,
by Harry E. Dunham
His Attorney.

Patented Sept. 1, 1942

2,294,692

UNITED STATES PATENT OFFICE 2,294,692

MEASUREMENT OF VOLT AMPERE DEMAND

William H. Pratt, Lynn, Mass., assignor to General Electric Company, a corporation of New York Application February 24, 1940, Serial No. 320,603

10 Claims. (Cl. 171—34)

My invention relates to a method and apparatus for the measurement of volt ampere demand, or the demand of the product of any two variables.

In alternating current power circuits the measurement of volt ampere hour demand as distinguished from watthour demand is becoming of increasing importance because it takes power factor into consideration. Apparatus for measuring volt ampere hours is, however, rather expensive as compared to a watthour meter and this has tended to limit the practice of establishing rates based on volt-ampere-hour demand measurements. One object of my invention is to provide less expensive apparatus for the measurement of volt ampere demand.

According to my invention I do not attempt to measure volt ampere hours, but rather I obtain a volt-ampere-hour demand measurement by measuring the demand of a quantity proportional to ampere hours over time intervals which are made to vary in proportion to the variation in voltage to the extent necessary to obtain demand measurements equivalent to volt-ampere-hour demand measurements over fixed time intervals. I provide a demand meter responsive to ampere hours and calibrated to register in volt-ampere-hour demand on the basis that the voltage of the circuit remains constant at normal value. I provide a timing device for establishing the demand time intervals over which the demand is measured. This timing device has an intentional error which is responsive to voltage changes and is accurate only when the voltage remains constant at normal value. When the voltage increases above normal by a certain percentage, the timing device runs slow by the same percentage and when the voltage is low by a certain percentage, the timing device runs fast by such percentage, so that the demand measurements are equivalent to the volt-ampere demands over correct demand time intervals.

For example, let us assume a power circuit in which the current is 10 amperes and the voltage is normal at 110 volts, and we wish to measure the thirty minute volt-ampere hour demand of said circuit. If the voltage remains normal, the timing device establishes the timing interval every 30 minutes and during such intervals the meter registers $$\frac{10 \times 110 \times 30}{60} = 550 \text{ V. A. H.}$$

If now the voltage increases to 121 volts or is 10% high the ampere hour responsive meter runs at the same rate but the timing device runs 10% slow so that the timing interval is 33 minutes instead of 30 and in such interval the measurement is $$\frac{10 \times 110 \times 33}{60} = 605 \text{ V. A. H.}$$

The latter measurement is the equivalent of the volt ampere demand over a 30 minute interval. If the voltage is 5% low or 104.5 volts, the timing device would run fast by 5% to establish the time interval in 28.5 minutes and the measurement would be $$\frac{10 \times 110 \times 28.5}{60} = 522.5$$

equivalent to $$\frac{10 \times 104.5 \times 30}{60}$$

the 30 minute demand.

The features of my invention which are believed to be novel and patentable will be pointed out in the claims appended hereto. For a better understanding of my invention, reference is made in the following description to the accompanying drawing, Fig. 1 of which represents a complete schematic embodiment of my invention; Fig. 2 a portion of a record sheet for my demand meter; and Fig. 3 another form of variable rate timing device that may be used.

In Fig. 1, 10 represents the rotary conducting disk of an ampere hour meter having stationary driving magnets 11 and 12 energized in proportion to the current flowing in the alternating current circuit 13. This produces a torque proportional to the square of the current, and in order to obtain a speed proportional to current, I provide a damping torque which increases with the square of the disk speed. Such means may take the form of a fan brake represented at 14 mounted on the shaft 15 of the meter. Such a meter measures ampere hours and may be provided with an ampere hour register 16. This meter is provided with any suitable demand metering attachment. In the illustration, meter shaft 15 drives a gear 17 which is splined on shaft 15 so as to be moved endwise thereon into and out of mesh with a second gear 18. Gear 18 drives through a suitable gear train indicated at 19 to advance a dog 20. In so doing a spring 21 is wound up which serves to return the dog 20 against a zero stop 22 when gears 17 and 18 are demeshed. During the interval when gears 17 and 18 are in mesh the dog advances in a clockwise direction in accordance with the rotation of the ampere hour meter to move a friction pointer 23 up-scale with respect to a scale 24 calibrated in volt ampere hour demand. When the dog is returned to a zero position the friction pointer remains in the up-scale position. During succeeding intervals the dog will advance the pointer further up-scale if the demand for preceding intervals has been exceeded and at the end of a month or week, or such other period as is chosen, the maximum advance of the pointer is read and it is returned toward zero against the dog 20. If, now, the gears 17 and 18 are demeshed momentarily every 30 minutes for example, the pointer 23 would register the maximum 30 minute demand for the ampere hour meter. In the ordinary demand meter an accurate timing device is provided to accomplish such momentary demeshing operation.

According to my invention I provide a timing device the timing accuracy of which is varied by variations in the voltage of line 13. For this purpose I provide a clock 25 which may be a synchronous motor energized from line 13 to provide an accurate time base. This clock drives a gear 26 through a differential 27. Gear 26 drives a cam 28 through a gear 29. Cam 28 is arranged to momentarily actuate a lever 30 at one point in the revolution of the cam for the purpose of momentarily raising gear 17 out of mesh with gear 18 to allow the spring 21 to reset dog 20 to zero against stop 22. Lever 30 is pivoted at 31. The central member of differential 27 is driven by a shaded pole induction motor consisting of a rotary disk 32 of conducting material, a stationary shaded pole driving magnet 33 and a magnetic damper 34. The magnet 33 is energized by a coil connected across line 13. The motor is so designed and loaded as to run at a speed proportional to the voltage of line 13 over the expected variation in voltage of such line. Hence this motor introduces a variable into the otherwise constant speed drive through the differential 27. The direction of rotation of motor 32 is such that the rotational movement which it imparts to the differential is subtracted from that imparted thereto by constant speed clock motor 25 so that cam 28 is driven at a speed proportional to the difference of constant speed clock 25 and variable speed motor 32. If the basic time interval for the measurement of demand is to be 30 minutes, the cam 28 will rotate at the rate of one revolution in 30 minutes when the voltage on line 13 is normal. For example, if motor 32 is purposely stopped, clock 25 may drive the cam 28 in its proper direction at the rate of two revolutions in 30 minutes. Then if the clock is purposely stopped and motor 32 is energized at normal voltage it may drive the cam backwards at the rate of one revolution in 30 minutes. Hence the forward normal speed of cam 30 is the difference or one revolution in 30 minutes. The scale 24 is calibrated in the 30 minute volt-ampere demand at normal voltage. For example, if the current is 10 amperes and the voltage is normal at 110 volts, dog 20 would advance pointer 23 up-scale in 30 minutes to a point marked .55 KVA, because 110 volts×10 amps×½ hour=.55 kilovolt ampere.

If, now, the voltage is 10% high or 121 volts, and the current through meter coils 11 and 12 remains at 10 amperes, the dog 20 will, of course, advance at exactly the same rate as before but the demand measuring interval instead of being 30 minutes will be 33 minutes, since motor 32 is designed to run sufficiently faster at the higher voltage to accomplish this result. The KVA of line 13 is at the rate of $$121 \times 10 \times \frac{30}{60} = .605$$

which is equivalent to $$110 \times 10 = \frac{33}{60}$$

or to the demand measurement in the 33 minute time interval.

If the voltage of line 13 is low, say 104.5 volts, the time interval for the demand measurement will be shortened to 28½ minutes. In this case the KVA of the line is at the rate of $$104.5 \times 10 \times \frac{30}{60} = .5225$$

which is equivalent to $$110 \times 10 \times \frac{28.5}{60} = .5225$$

or the demand measurement in the 28½ minute time interval.

Inasmuch as on present day power systems the voltage does not vary greatly, the range of speed adjustment for the timing device does not need to be very large and over such range it can be made to respond closely with the voltage variations. In the two above examples the voltage was assumed to be 10% high and 5% low over a complete demand interval. These are unusual voltage conditions. It is more probable that the voltage variations from normal will be generally less than this and vary both above and below normal during a demand interval so that the changes in the speed of the timing device in response to voltage variations will be averaged over a demand time interval and such time interval will rarely vary greatly from the base time interval which in the example given above was 30 minutes. In view of these circumstances it is feasible to record the measured volt ampere demand on a time-graduated record sheet.

In Fig. 1 I have indicated a recording pen 35 actuated with the demand dog 20 and cooperating with a record sheet 36 to record the demand measurements. As shown in Fig. 2, such a record sheet may have the usual time graduations 37 along one margin and be advanced exactly the distance between such graduations each basic time interval and where an accurate clock is employed in the time interval mechanism, as in Fig. 1, it may be used to advance the chart as there indicated through the belt and pulleys represented at 38. As represented in Fig. 2, the demand records 39 are not uniformly spaced. Thus the spacing at $l$ is less than at $h$. This variation in spacing is a direct indication of the average voltage over the different time intervals. Thus the spacing at $h$, slightly greater than the time graduations, indicates that during the time beween the making of these records the average voltage was above normal, whereas the spacing at $l$ which is slightly less than the time graduations indicates that during such time the average voltage was below normal. It is significant to note that during the relatively short time interval $l$ when the voltage was low the demand measurement 39a over such interval was quite large, whereas over the longer time interval $h$ indicating a high average voltage the demand measurement 39b was quite low. Where such relation is characteristice of the records obtained, it indicates that the heavy volt ampere loads such as 39a are pulling down the voltage on the particular load being metered and that it is probably a situation that requires investigation and correction. Such records thus give valuable information in addition to the volt ampere demand measurement records.

In Fig. 3 I have represented a spring-driven escapement clock provided with means for varying its rate in response to voltage changes such that it will run slow when the voltage is high and run fast when the voltage is low. Such a clock, when properly calibrated in relation to the voltage variations, may be used to establish the variable time interval of my volt ampere demand meter. In Fig. 3, 40 represents the main spring of the clock and is shown as being wound by a small induction motor 41 energized from the line 13. The spring 40 is connected to drive the cam 28 of my demand meter at a rate determined by the escapement mechanism 42 and the gearing 43 between the escapement and cam 28. 44 represents the hair spring of the escapement and 45 the balance wheel thereof. These parts are of well-known construction and need no detailed explanation.

In order to change the rate of the clock in response to voltage variations of the line 13, I provide means 46 for varying the effective length of the hair spring 44 operated by a voltage responsive device 47. The voltage responsive device is essentially a voltmeter element having field coils 48 connected across line 13 through an adjustable impedance 49, an iron vane armature 50 on a shaft 51 and a spiral spring 52 for opposing the rotation of shaft 51 by the volt measuring torque thereof. The means for varying the effective length of the control spring is the lever 46 fastened to shaft 51 and having fingers 53, 54, 55 and 56 arranged to press against various points of spring 44 for different rotary positions of shaft 51 in response to voltage variations. When the hair spring of an escapement device is shortened, the rate of the escapement increases and vice versa. It is seen that spring 52 provides a tension which tends to rotate shaft 51 clockwise against the voltmeter torque which tends to rotate the shaft 51 counter-clockwise. The illustration may represent that for normal voltage of line 13 and a clock rate corresponding to the basic time interval. It is seen that finger 53 is pressed firmly against spring 44, thereby in effect fixing the outer or stationary end of the spring at such point. Finger 54 rests lightly against the spring 44 and to the extent it is effective will shorten the hair spring 44 by nearly one loop.

However, 54 is only partially effective since as the escapement oscillates, the loops of the hair spring move towards and away from the center and hence finger 54 will touch the spring only a portion of the time and at other times the effective length of the spring will be determined by pin 53.

If, now, the voltage decreases, shaft 51 will turn clockwise. This will first press pin 54 more firmly against spring 44, next bring finger 55 against the spring reducing its length, and finally for still lower voltages bring finger 56 against the next inner loop of the spring, thus gradually shortening the effective length of the hair spring and increasing the rate of the clock.

For voltages above normal the lever 46 will move counter-clockwise from the position shown gradually lengthening the effective length of the spring and reducing the clock rate. In this way the clock may be regulated to have a rate which varies inversely as the variation in voltage over the expected range of voltage variation and hence serve to establish the variable time intervals of my volt-ampere demand measuring equipment as contemplated.

If desired, I may extend one of the fingers 54 into such position that for voltage failures it will rise and contact the balance wheel 45 of the clock and stop the clock during such voltage failure. This function is inherent in the arrangement of Fig. 1 because if power fails, both of the motors 25 and 32 will stop.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. The method of obtaining the volt-ampere demand of a power circuit which consists in integrating the ampere hours of the circuit over time intervals which vary directly as the voltage of such circuit.

2. The method of obtaining measurements equivalent to the product of two variables over fixed time intervals which consists in integrating one of said variables over time intervals which vary directly as the other variable.

3. The method of obtaining measurements equivalent to the volt-ampere demand of a power circuit in which the current and voltage varies, which consists in establishing measurement time intervals proportional to the average value of one of said variables over the respective time intervals and obtaining the integrated value of the other variable during each such time interval in terms of the product of such variables.

4. Apparatus for obtaining measurements equivalent to the integrated demands of the product of two quantities over fixed time intervals comprising in combination an integrating meter for integrating one of said variables, demand measuring means for said meter including timing means for establishing the demand measurement time intervals thereof and means for causing the timing rate of said timing means to be inversely proportional to the other variable.

5. Apparatus for obtaining the volt-ampere hour demand of a power circuit comprising an ampere hour meter for integrating the current of said circuit, demand apparatus for measuring the integrated demand of said meter over consecutive time intervals, said demand apparatus including a timing device for establishing the demand measuring time intervals of said meter, and means responsive to the voltage of said circuit for causing said time intervals to vary in duration in proportion to the voltage of said circuit.

6. Apparatus for measuring volt-ampere hour demand comprising an ampere hour meter, a demand meter associated therewith for measuring the demand of said meter over consecutive time intervals, said demand meter including a timing device for establishing the timing intervals, and voltage responsive means for varying the timing rate of said timing device such that the demand measurement time intervals established thereby vary in proportion to the voltage applied to said voltage responsive means.

7. In a demand meter, a time interval mechanism for establishing the measurement time interval of said meter, said mechanism including a clock for driving said mechanism, a differential, through which said mechanism is driven by said clock, and motor means, the speed of which is responsive to a variable, connected in driving relation with said differential for the purpose of varying the time interval of said demand meter in accordance with such variable.

8. In a demand meter, a time interval mechanism for establishing the demand measuring periods of said meter, a timing device for driving said mechanism and electrical means responsive to a variable for varying the timing rate of said timing device in accordance with such variable.

9. In a demand meter, a time interval mechanism, a clock for establishing the measurement time interval of said mechanism, said clock having a hair spring escapement for controlling its rate and means responsive to a variable for varying the effective length of said hair spring to vary the rate of the clock and to cause the length of the demand measuring time intervals to vary in accordance with such variable.

10. Apparatus for obtaining the volt-ampere demand of a power circuit comprising an ampere hour meter operated in response to the current in such circuit, a demand meter associated with said ampere hour meter for measuring the integrations thereof over consecutive time intervals, means responsive to the voltage of such power circuit for controlling the demand measuring time interval of said demand meter so that it is proportional to the voltage of such circuit, whereby the demand measurements are proportional to the volt-ampere hour demand of such circuit and recording means associated with said apparatus for producing records of said demand measurements and the relative lengths of the time intervals over which such measurements are made.

WILLIAM H. PRATT.